United States Patent [19]

Pompe

[11] Patent Number: 4,492,665
[45] Date of Patent: Jan. 8, 1985

[54] PROCESS FOR THE PRODUCTION OF MOULDINGS FROM MATERIALS BASED ON SILICON NITRIDE

[75] Inventor: Robert Pompe, Moelndal, Sweden

[73] Assignee: Swedish Institute for Silicate Research, Goeteborg, Sweden

[21] Appl. No.: 463,884

[22] PCT Filed: May 10, 1982

[86] PCT No.: PCT/SE82/00161
§ 371 Date: Jan. 21, 1983
§ 102(e) Date: Jan. 21, 1983

[87] PCT Pub. No.: WO82/04245
PCT Pub. Date: Dec. 9, 1982

[30] Foreign Application Priority Data

May 25, 1981 [SE] Sweden ............... 8103269

[51] Int. Cl.³ .................. C01B 21/68; C04B 35/58
[52] U.S. Cl. ........................ 264/65; 501/97; 501/98
[58] Field of Search ............... 501/97, 98; 264/65

[56] References Cited

U.S. PATENT DOCUMENTS 3,591,337  7/1971  Lumbey ............... 501/97
4,125,952 11/1978  Ezis et al. ............ 501/97
4,264,547  7/1981  de Pous ............... 501/97

FOREIGN PATENT DOCUMENTS 2734772  2/1978  Fed. Rep. of Germany ........ 501/97
0025356 11/1968  Japan ................. 501/97
0095680  7/1980  Japan ................. 501/97
0942082 11/1963  United Kingdom ....... 501/97
1365126  8/1974  United Kingdom .
1396773  6/1975  United Kingdom ....... 501/97

Primary Examiner—R. L. Andrews
Assistant Examiner—Terryence Chapman
Attorney, Agent, or Firm—Stevens, Davis, Miller & Mosher

[57] ABSTRACT

Process for the production of moulded bodies of materials based on silicon nitride, where the powder mix prepared by way of initial material contains silicon nitride ($Si_3N_4$), a high proportion, preferably 40–85 percent by weight, of silicon (Si) and a sintering aid. With conventional sintering the above powder mix is advantageously prepared by grinding of an Si-powder dispersed in an $Si_3N_4$ powder the grain size of which is considerably lower than that of the Si-powder. The process covers in the main the production of a body moulded from this powder mix by known moulding methods, nitriding of the Si-content to $Si_3N_4$ and sintering of the moulded body to a final required density.

7 Claims, No Drawings

PROCESS FOR THE PRODUCTION OF MOULDINGS FROM MATERIALS BASED ON SILICON NITRIDE

The present invention relates to a process for the production of mouldings from materials based on silicon nitride in accordance with the preamble of patent claim 1.

As a first step in this process a powder mix is prepared by grinding/mixing silicon nitride with silicon powder containing a high percentage of Si, preferably 40–85 percent by weight in relation to the amount of $Si_3N_4$ added, and a sintering aid, whereby the silicon nitride powder serves as a dispersing agent for silicon and enables grinding down of the mix to a mean particle size of less than 1 μm. After preparation of a moulding by means of known moulding methods (pressing, casting, injection moulding etc.) the silicon content of this body is, by way of the next step in this process, partly or fully nitrided to silicon nitride, thus bringing about an internal increase in mass and, accordingly, an increase in the so-called green density (i.e. compact density prior to sintering) of the body produced from powder. After machining, if applicable, the moulding is subjected to final nitriding and is then sintered, preferably by conventional means (without simultaneous application of mechanical pressure) with the assistance of the sintering aid added, until a final required density is achieved.

Materials based on silicon nitride are regarded as belonging to the group of high-temperature ceramics. The main characteristics of these materials are their elevated high-temperature strength, wear resistance and corrosion resistance, which ensure that they are suitable for components of internal combustion engines as well as for parts subject to wear and for machining.

When manufacturing products from these materials use is most often made of traditional ceramic or powder-metallurgical moulding methods such as slip casting, injection moulding, pressing or a combination of these processes. Temporary binders, injection moulding plastics and/or pressing aids are removed in the normal way by burning off (fuming off). Dense materials can be achieved by applying two types of sintering methods, i.e. by sintering (in a conventional way or subject to simultaneous application of mechanical pressure—pressure-sintering) of bodies made from $Si_3N_4$-powder with an addition of sintering aid, or by nitriding bodies formed from Si-powder (reaction-sintering). As a rule, sintering is effected in a nitrogen atmosphere (possibly subject to overpressure) at temperatures above 1500° C., whereas reaction-sintering is generally effected in several stages close to the melting point for pure silicon.

However, these methods are subject to various disadvantages which hinder their commercial application. It is for instance possible to achieve an entirely non-porous material by pressure-sintering, but only uncomplicated shapes can be produced by this method. With reaction sintering it is possible to produce complex shapes with high dimensional tolerance owing to the fact that the amount of shrinkage which occurs in the course of nitriding is low. The nitriding process does however result, on the one hand, in a material with a residual porosity of normally 15–20% which entails a relatively low strength level, and, on the other hand, necessitates a treatment period amounting to one or several days. It is assumed that this is due to the low rate at which nitrogen is diffused within the generated microstructure of the silicon nitride. A fine-grained microstructure with an increased proportion of grain boundaries can result in increased nitrogen permeability. In order to bring about such a microstructure it is desirable to start with a finely ground Si-powder, preferably with a grain size of less than 1 μm. However it is hard to grind down silicon to the said grain size owing to the difficulty of dispersing the ground powder.

With conventional sintering (often described in the literature as pressureless sintering) a completely dense material can be achieved, with a strength comparable to that of pressure-sintered material. Complex mouldings can, in addition, be achieved by known moulding methods. So as to achieve a high compact density by conventional sintering, it is however essential to use powder material with very fine grains—i.e. the mean grain size must be less than 1 μm. This entails that the green density of the bodies formed from powder can rarely be made to exceed 50%. As a result, the amount of shrinkage associated with sintering is high, as a rule 15–20%, making it difficult to maintain the required dimensional tolerances.

A combined sintering method has also been proposed and made subject of a patent application (A. Giachello and P. Popper in "Energy and Ceramics", Ed. P. Vincenzini (1980) p.620), according to which a body is moulded from silicon powder to which a sintering aid has been added. Following the removal of temporary binder the body is first nitrided to a density corresponding to that of a reaction-sintered material. At another stage, it is said, the said body can be resintered with the assistance of the added sintering aid until the full compact density has been reached. The shrinkage during this process comes to a halt at 6–7%. From the point of view of process technology the reaction-sintering method is subject to a disadvantage, i.e. it still entails the time-consuming nitriding process.

It is also known from the Swedish application No. 800500-1 how to add silicon to silicon nitride powder when injection moulding bodies for isostatic pressure-sintering. These bodies are subject to considerable mechanical stresses during manipulation in the preparative stages of the isostatic sintering process. By nitriding the Si-content in the moulded body (which should amount to 6–60 percent by weight) after burning off the plastic injection moulding components the strength and, as a result, the suitability for manipulation of the moulded body is claimed to be capable of being increased to a considerable extent. A further advantage consists in the fact that the time required for nitriding the Si-content in the moulded body is considerably shorter than with a body consisting only of Si-powder. The isostatic pressure-sintering method can accordingly be used also for producing complex mouldings. However, this method presupposes costly investments in equipment and it is necessary to finish the surfaces of the pressure-sintered bodies to a certain extent, thus restricting its commercial usefulness.

A general comparison shows that application of the conventional sintering method is advantageous, not least from the commercial point of view, and that it results in material with satisfactory mechanical characteristics. As already stated in the general section it is necessary with conventional sintering to make use of fine-grained powder material (grain size less than 1 μm). These fine powders are as a rule difficult to compact. This results in insufficient grain density, especially when use is made of the moulding methods—slip casting and injection moulding—suitable for large-scale production of mouldings from these materials.

The process according to the present invention aims at overcoming the disadvantage entailed by this method, i.e. the high degree of shrinkage during sintering, and at offering a method for achieving this end without introducing other parameters capable of complicating the process technology.

With the process in accordance with the present invention the green density of the moulded bodies can be increased considerably by using as a starting material a powder mix consisting of Si- and $Si_3N_4$-powder and a sintering aid containing a high proportion of silicon, preferably more than 40 percent by weight in relation to the amount of $Si_3N_4$. In accordance with the process proposed a body is moulded from this powder mix and after removal (burning off) of temporary binder added at the moulding stage the silicon content is nitrided fully or partly to silicon nitride. This causes an internal increase in mass without dimensional changes in the body moulded from powder and, accordingly, to an increase in the density of the latter. After machining if any—to adjust dimensions—the body is subjected to final nitriding (if only partial nitriding has taken place) as a result of which virtually all the silicon is converted to silicon nitride. It is shown that by using a mix of Si and $Si_3N_4$, nitrogen will permeate the nitrided body to a considerably increased extent. As a result, the nitriding period can be reduced, on average at least to a power of ten, by comparison with the known reaction-sintering methods. The final stage in the process proposed consists in sintering the body moulded from powder and nitrided with the assistance of the added sintering aid until a required final density is achieved.

In the powder mix which is used, the silicon nitride shall be substantially present by way of $\alpha$-phase, whereas it is known that in the course of sintering but without affecting the sintering process as such, the latter is converted to $\beta$-phase. This conversion results in a higher strength level of the sintered material than if $\beta$-phase is present in the initial powder. The silicon in the powder mix used shall be of a grade which, according to the literature in respect of raw materials for reaction-sintered silicon nitride, can be nitrided subject to corresponding temperature and gas atmosphere conditions such as are suitable for the production of the reaction-sintered material. The high proportion of silicon in the powder mix used, which constitutes an important characteristic of this process, is essential for achieving a high green density after the nitriding stage. So as to be able to achieve a significant increase in green density, the proportion of Si must accordingly not be less than 40 percent by weight in relation to the amount of $Si_3N_4$. The upper limit for the amount of Si added to the mix will depend on the nitriding time required for converting virtually all the silicon to silicon nitride. With a view to maintaining the process technological advantage of the process proposed, which consists in a substantial reduction of the nitriding time—by at least a power of ten by comparison with the known reaction sintering processes—it is advisable not to use mixes containing more than 85 percent by weight of Si.

By way of sintering aid the substances described in the scientific literature may be used, i.e. preferably metal oxides in the conventional proportions, i.e. 0.1–20 percent by weight. When producing material based on silicon nitride of the type SiAlON, i.e. materials based on phases occurring within the system $Si_3N_4$-$SiO_2$-$Al_2O_3$-AlN, the combined amount of other substances added including sintering aids, for instance $Al_2O_3$ and AlN in the important partial system $Al_2O_3$-AlN-$Si_3N_4$ (material based on $\beta'$-phase) may considerably exceed 20 percent by weight.

For nitriding the body moulded from powder use may be made of a separate nitriding oven, but in view of the reduced nitriding time achieved with this process, nitriding can also be advantageously effected in the oven used in the next process phase for sintering. The nitrided body can preferably be sintered by conventional means but pressure-sintering is also possible. Conventional sintering must be effected in a nitrogen atmosphere. So as to prevent weight losses such as normally occur especially at the introductory stage of the sintering process owing to the fact that the material disintegrates, it should also be advisable to effect sintering at a nitrogen gas pressure at least equal or higher than 1 atm (0.1 MPa) or/and to make use of the known powder-bed technology, with the sintered body packed in protective powder.

For conventional (pressureless) sintering it is essential that the powder mix used (Si-$Si_3N_4$-sintering aid) consists of a fine-grained material as stated above. It is also an object of the present invention to offer a method for producing a powder mix satisfying the need for a powder material capable of being sintered. According to the method proposed, a fine-grained powder mix is produced by grinding a silicon powder together with silicon nitride powder and a sintering aid, whereby the Si-powder used by way of initial material consists of grains the average size of which is larger than that of the grains in the $Si_3N_4$-powder. With a preferred embodiment the grain size of the $Si_3N_4$-powder added prior to grinding is already at the level suitable for conventional sintering. In the course of grinding the addition of $Si_3N_4$-powder acts as a dispersant for the Si-powder as a result of which the Si-powder can be ground down to at least approximately the same mean grain size as the $Si_3N_4$-powder added. $Si_3N_4$ constitutes a regular component of the powder mix while at the same time acting as a dispersant for Si thus facilitating the grinding down of Si to a lesser grain size than if only pure Si were subjected to the same grinding procedure.

The choice of grain size with the Si-powder used by way of initial material will depend on the required grinding conditions. Studies in accordance with the method proposed show that these conditions (method of grinding, grinding bodies, grinding time etc.) can be selected so that the Si-powder undergoes both grinding and re-mixing, but as regards the $Si_3N_4$-powder and the sintering aid added the grinding procedure entails substantially only re-mixing. The above studies have shown that with a specific embodiment using a ball mill, the mean grain size must as a rule not exceed 50–100 $\mu$m. In this case the utilisation of Si-powder of considerably larger grain size than that of the $Si_3N_4$ added leads both to a considerable lengthening of the grinding time and an increased risk for quantitative ingrinding by grinding bodies and grinding vessel walls before the dispersing mechanism starts to operate. When applying an effective grinding method, for instance attrition grinding with grinding bodies consisting of a specially strong, wear-resistant and hard material ($Si_3N_4$, SiC, BN) it is however possible to use an even coarser grade of Si-powder by way of initial material.

The grain size of the $Si_3N_4$ added prior to grinding shall in accordance with the method proposed be lower than that of the Si-powder and should, in accordance with the preferred version, be within the range 0.05–1 μm, which is a grain size suitable for conventional sintering. For efficient dispersion during the entire grinding process with the stated Si-content range (40–85 percent by weight), the particle size of the Si-powder should generally exceed that of the $Si_3N_4$-powder by at least a power of ten. The grain size of the sintering aid added should as a rule be less than that of the $Si_3N_4$ already prior to grinding, since the generally low proportion added entails only an insignificant degree of grinding down and, as a result, a distribution in the powder mix achieved after grinding, which from the point of view of sintering is uneven.

The proposed process and method of implementing the present invention may become clearer from the following practical example which describes the preparation of a powder mix in accordance with the present invention with a view to conventional sintering and the process for sintering a body moulded from the said powder mix. The powder mix described in this example is prepared from $Si_3N_4$ (HC Stark, grade LC10), Si-powder (purity 97.5%) and a sintering aid consisting of $Y_2O_3$ and $Al_2O_3$. The specific surface (BET) characterising the grain size of a powder amounting to 16.3 $m^2/g$ (mean grain size <0.1 μm) as regards $Si_3N_4$, and 0.5 $m^2/g$ as regards Si-powder, which also contained a proportion of grains up to 50 μm. 45 percent by weight of Si and $Si_3N_4$-powder (50% Si relative to $Si_3N_4$) and 7.5 percent by weight $Y_2O_3$ as well as 2.5 percent by weight $Al_2O_3$ by way of sintering aid were introduced into the grinding vessel of a swinging ball mill. The grinding vessel and the grinding balls consisted of agate. The mix was wet-ground in ethanol for 15 hours, whereupon it was centrifuged in order to separate it from ethanol and finally dried on a water bath. Following this treatment the specific surface of the mix was measured as 15.0 $m^2/g$, which means that in the main only Si-powder was subjected to grinding to a grain size of the same order of magnitude as the $Si_3N_4$-powder added.

The powder mix was moulded to a body by isostatic pressing at 280 MPa which resulted in a green density of 58%. The process proposed was then applied in two stages—nitriding and sintering. Nitriding was carried out in a thermal balance in which the absorption of nitrogen was continuously recorded as a function of time. The weight of the test body which indicated the amount of nitrogen absorbed was stabilised after about 2 hours at 1350° C., this nitriding time being at least by a power of ten shorter than with the known reaction-sintering process. The Si-powder applied contained about 1 percent by weight Fe by way of impurity, which according to descriptions in the literature should also have facilitated nitriding. The increase in weight obtained amounted to 20.4%, which means that virtually all Si was converted to $Si_3N_4$. On the other hand, the green density after nitriding increased from 58% to 67% and the test body shrunk by about 1%.

Sintering was effected in a graphite resistance oven with the test body embedded in a layer of protective powder containing $Si_3N_4$, $Al_2O_3$ and AlN. The sintering program consisted in treatment for 2.5 hours at 1780° and an aftersintering stage of 0.5 hours at 1850°. Measurements of the test body carried out after this treatment showed a final density of 98.8% of the expected compact density and a linear shrinkage in the region of 11.5%.

In a corresponding implementation example it also proved possible to effect the nitriding process in a sintering oven as a result of which the entire sintering procedure could be carried out without having to manipulate the body moulded from powder between the mouldings and the final sintering stages.

I claim:

1. A process for the production of moulded bodies consisting of materials based on silicon nitride comprising preparing a powder mix of silicon powder, silicon nitride powder and a sintering aid, moulding said mix, nitriding the Si-content to $Si_3N_4$ and sintering, characterised in that the silicon powder is ground down to a mean particle size below 1 μm in the presence of silicon nitride powder as a dispersing agent and in the presence of sintering aids and, that a body moulded of this powder mix hereafter is nitrided during a time period not longer than 5 (five) hours whereby the nitriding temperature is kept below the melting point of pure silicon.

2. A process in accordance with claim 1, characterised in that the grain size of the Si-powder added prior to grinding exceeds that of the $Si_3N_4$-powder.

3. A process in accordance with the claim 1, characterised in that the content of Si-powder is kept within the range of 40–85 percent by weight relative to the amount of $Si_3N_4$ added.

4. A process in accordance with claim 1, characterised in that nitriding of the body moulded from powder is effected in the same oven as the subsequent sintering process.

5. The process in accordance with claim 2, characterised in that the content of Si-powder is kept within the range of 40–85 percent by weight relative to the amount of $Si_3N_4$ added.

6. The process in accordance with claim 2, characterised in that nitriding of the body moulded from powder is effected in the same oven as the subsequent sintering process.

7. The process in accordance with claim 3, characterised in that nitriding of the body moulded from powder is effected in the same oven as the subsequent sintering process.

* * * * *